(12) United States Patent
Goyal et al.

(10) Patent No.: US 8,646,936 B2
(45) Date of Patent: Feb. 11, 2014

(54) IN-WALL OCCUPANCY SENSOR WITH DIMMABLE NIGHT LIGHT

(75) Inventors: Rahul Goyal, Tyrone, GA (US); Oscar Neundorfer, Senoia, GA (US); James Fair, Fayetteville, GA (US); Ahmed Elgayyar, Senoia, GA (US); Jason Sherrill, Atlanta, GA (US)

(73) Assignee: Cooper Technologies Company, Houston, TX (US)

( * ) Notice: Subject to any disclaimer, the term of this patent is extended or adjusted under 35 U.S.C. 154(b) by 302 days.

(21) Appl. No.: 12/794,199

(22) Filed: Jun. 4, 2010

(65) Prior Publication Data

US 2011/0298392 A1 Dec. 8, 2011

(51) Int. Cl.
*F21S 8/00* (2006.01)
*B60Q 1/26* (2006.01)

(52) U.S. Cl.
USPC ............ 362/147; 700/295; 315/294; 362/227

(58) Field of Classification Search
None
See application file for complete search history.

(56) References Cited

U.S. PATENT DOCUMENTS

| | | | |
|---|---|---|---|
| 2,905,779 A * | 9/1959 | Schmier ................. | 200/51.17 |
| 4,787,722 A | 11/1988 | Claytor | |
| 5,924,486 A * | 7/1999 | Ehlers et al. ............ | 165/238 |
| 6,285,912 B1 | 9/2001 | Ellison et al. | |
| 6,648,496 B1 * | 11/2003 | Elghoroury et al. ....... | 362/555 |
| 6,894,434 B1 * | 5/2005 | Kosoff ...................... | 315/134 |
| 6,967,565 B2 | 11/2005 | Lingemann | |
| 7,130,719 B2 | 10/2006 | Ehlers et al. | |
| 7,274,975 B2 | 9/2007 | Miller | |
| D595,604 S | 7/2009 | Schmalz et al. | |
| 7,649,472 B1 | 1/2010 | Paterno | |
| 7,724,557 B2 | 5/2010 | Ganta Papa Rao Bla et al. | |
| D619,275 S | 7/2010 | Pineault et al. | |
| D652,549 S | 1/2012 | Pineault et al. | |
| 8,346,403 B2 * | 1/2013 | Goyal et al. .............. | 700/295 |
| 2008/0079568 A1 | 4/2008 | Primous et al. | |
| 2009/0256483 A1 | 10/2009 | Gehman et al. | |
| 2011/0093094 A1 | 4/2011 | Goyal et al. | |
| 2011/0298392 A1 | 12/2011 | Goyal et al. | |
| 2011/0301776 A1 | 12/2011 | Goyal et al. | |

OTHER PUBLICATIONS

WN-100 Motion Sensor Nightlight Switch Installation Instructions; wwwwattstopper.com May 2005.

* cited by examiner

*Primary Examiner* — Natalie Walford
(74) *Attorney, Agent, or Firm* — King & Spalding LLP

(57) ABSTRACT

An electrical wiring device includes a dimmable night light therein. The night light includes one or more light sources for emitting light and an optional lens disposed over the light sources. The lens allows light from the light sources to be emitted therethrough. In some embodiments, the lens is used to turn on the night light, turn off the night light, and dim the night light. In some exemplary embodiments, manipulation of the lens selects an operating mode for the device. The device optionally includes an occupancy detection sensor to assist detecting occupancy within a monitored area.

37 Claims, 5 Drawing Sheets

IN-WALL OCCUPANCY SENSOR WITH DIMMABLE NIGHT LIGHT

TECHNICAL FIELD

The present invention relates generally to electrical wiring devices and more particularly, to electrical wiring devices that include a dimmable night light.

BACKGROUND

There are many situations that arise where people desire a night light in a room, hallway, or other area whether or not that room, hallway, or other area has a lighting load, such as a bedroom light, electrically coupled to an electrical wiring device. A lighting load, or associated lighting load, is a light source that is remotely located from the electrical wiring device but is electrically coupled to one or more electrical contacts of the electrical wiring device using one or more electrical wires. Some examples of lighting loads include, but are not limited to, luminaires and lamps. The night light generally provides lower level lighting than the lighting load. In one situation, some people can use night lights in their bedroom or hallway so that they can walk around, for example, to the restroom or to the kitchen, without bumping into anything when they wake up in the middle of the night. In another situation, some people can use night lights in their bedroom so that they can locate items, for example, their watch or their glasses, when they wake up in the middle of the night. In yet another situation, parents can use night lights in their children's bedroom so that they can enter their children's bedroom in the middle of the night to monitor their children without having to turn on the lighting load, or bedroom light in one exemplary scenario, and possibly disturb the children. These are a few exemplary situations for what people oftentimes use night lights. As exemplified, night lights provide sufficient lighting for people at night time to perform different tasks without having to turn on the lighting loads that are electrically coupled to the electrical wiring device.

Conventional night lights are typically plugged into an electrical receptacle, which is usually located closer to floor level. These conventional night lights provide lighting near the floor level and therefore provide limited distance illumination. Additionally, these conventional night lights are easily removed and misplaced and/or damaged. For example, small children can easily remove these conventional night lights and place them in difficult-to-find locations, such as in drawers or in toy boxes. Moreover, these conventional night lights provide low level lighting that is not adjustable based upon end-user preferences. Thus, regardless of the purpose of the night light or the desires of the end-users, the conventional night light emits a substantially uniform intensity light.

SUMMARY

An exemplary embodiment of the present invention includes an electrical wiring device. The electrical wiring device includes a night light. The night light includes one or more light sources that emit light. The intensity of the light emitted from the night light is variable.

Another exemplary embodiment of the present invention includes an electrical wiring device. The electrical wiring device includes a night light. The night light includes one or more light emitting diodes ("LEDs") and a lens disposed over the LEDs. The LEDs emit light and the lens allows the light to pass through it. The intensity of the light emitted from the night light is variable. Also, the lens is manipulated to adjust the intensity of the light emitted from the night light.

Another exemplary embodiment of the present invention includes a lighting control system. The lighting control system includes at least one load and a lighting control device electrically coupled to the load. The load is positioned within an area. The lighting control device includes a night light. The night light includes one or more LEDs that emit light. The intensity of the light emitted from the night light is variable.

Another exemplary embodiment of the present invention includes a method for operating a night light formed within an electrical wiring device. The method includes providing the electrical wiring device having the night light therein and manipulating the intensity of the light emitted from the night light. The night light includes one or more light sources that emit light.

BRIEF DESCRIPTION OF THE DRAWINGS

The foregoing and other features and aspects of the invention are best understood with reference to the following description of certain exemplary embodiments, when read in conjunction with the accompanying drawings, wherein.

Figure 1:
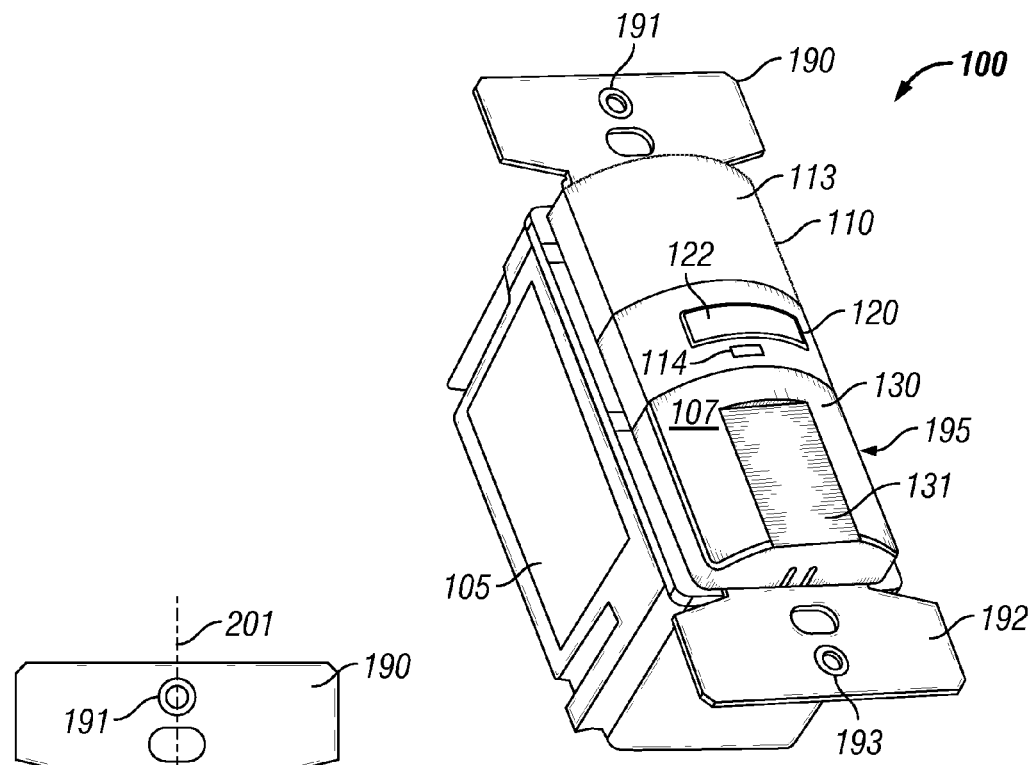
FIG. 1 is a perspective view of an in-wall occupancy sensor switch in accordance with an exemplary embodiment of the present invention.

The drawings illustrate only exemplary embodiments of the invention and are therefore not to be considered limiting of its scope, as the invention may admit to other equally effective embodiments.

BRIEF DESCRIPTION OF EXEMPLARY EMBODIMENTS

The present invention is directed to electrical wiring devices that provide a dimmable night light. Although the description of exemplary embodiments is provided below in conjunction with an in-wall occupancy sensor switch, alternate embodiments of the invention are applicable to other types of electrical wiring devices including, but not limited to, receptacles, switches, and any other electrical wiring device known to people having ordinary skill in the art. The invention is better understood by reading the following description of non-limiting, exemplary embodiments with reference to the attached drawings, wherein like parts of each of the figures are identified by like reference characters, and which are briefly described as follows.

Figure 2:
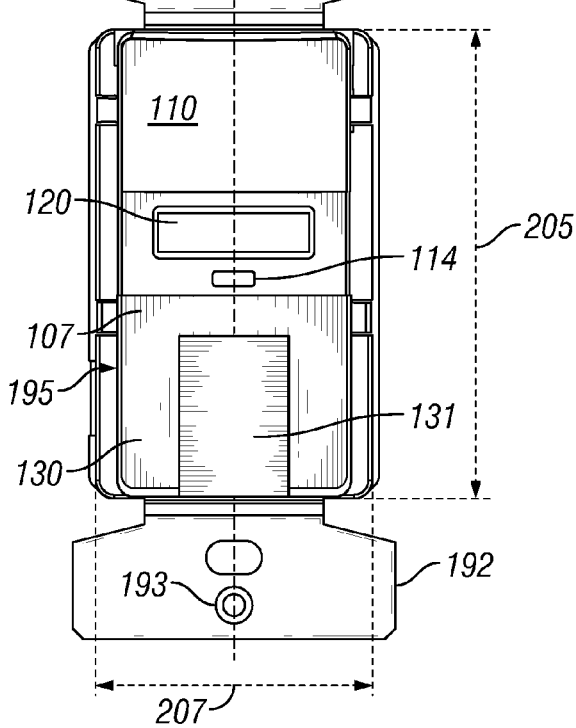
FIG. 2 is a front elevation view of the in-wall occupancy sensor switch of FIG. 1 in accordance with an exemplary embodiment of the present invention.

FIG. 1 is a perspective view of an in-wall occupancy sensor switch 100 in accordance with an exemplary embodiment of the present invention. FIG. 2 is a front elevation view of the in-wall occupancy sensor switch 100 in accordance with an exemplary embodiment of the present invention. Referring to FIGS. 1 and 2, the in-wall occupancy sensor switch 100 is substantially rectangularly shaped and includes an upper coupling band 190, a lower coupling band 192, a body 105, and a face plate 107. However, the in-wall occupancy sensor switch 100 is formed in different geometric and non-geometric shapes according to other exemplary embodiments. The face plate 107 includes a length 205 and a width 207.

The upper coupling band 190 and the lower coupling band 192 are formed separately from one another and are both partially disposed between the body 105 and the face plate 107. However, in some exemplary embodiments, the upper coupling band 190 and the lower coupling band 192 are formed as a single component. The upper coupling band 190 and the lower coupling band 192 extend lengthwise of the face plate 107 and collectively extend beyond the length 205 of the face plate 107 in both directions. The upper coupling band 190 includes an upper coupling band aperture 191 and the lower coupling band 192 includes a lower coupling band aperture 193. These apertures 191 and 193 are used to couple the in-wall occupancy sensor switch 100 to a wall box (not shown) using a screw (not shown) or other fastening device known to people having ordinary skill in the art. The upper coupling band 190 and the lower coupling band 192 are fabricated using a metal, such as steel, but are capable of being fabricated using other materials known to people having ordinary skill in the art.

The body 105 is coupled to at least one of the upper coupling band 190, the lower coupling band 192, and the face plate 107. The body 105 is substantially rectangularly shaped but is capable of being formed in other geometric or non-geometric shapes. In certain exemplary embodiments, the body 105 includes electrical components (not shown), including electrical contacts, for electrically coupling the in-wall occupancy sensor switch 100 to building wires (not shown) and to load wires (not shown) that are electrically coupled to an associated load (not shown). The body 105 is dimensioned to fit within the wall box. In certain exemplary embodiments, the body 105 is fabricated using plastic material. However, the body 105 is capable of being fabricated using other materials known to people having ordinary skill in the art according to other exemplary embodiments.

The face plate 107 is coupled to at least one of the upper coupling band 190, the lower coupling band 192, and the body 105 and remains visible to an end-user once the in-wall occupancy sensor switch 100 is installed within the wall box. The face plate 107 is substantially rectangularly shaped but is capable of being formed in other geometric or non-geometric shapes. In some exemplary embodiments, the face plate 107 has a profile that is substantially similar to the profile of the body 105 and is disposed over the body 105. The face plate 107 includes an occupancy detection sensor 110, a night light 120, and a manual controller 195. According to one exemplary embodiment, the night light 120 is disposed adjacent the occupancy detection sensor 110 and the manual controller 195; thereby being positioned between the occupancy detection sensor 110 and the manual controller 195. The occupancy detection sensor 110 is positioned along the top portion of the face plate 107, while the manual controller 195 is positioned along the bottom portion of the face plate 107. Although the positioning for the occupancy detection sensor 110, the night light 120, and the manual controller 195 has been provided in accordance with one of the exemplary embodiments, other exemplary embodiments can have alternative positioning of the occupancy detection sensor 110, the night light 120, and the manual controller 195 on the face plate 107 without departing from the scope and spirit of the exemplary embodiment.

The occupancy detection sensor 110 is able to activate upon sensing the occupancy of the monitored area, maintain activation when sensing continuing occupancy of the monitored area, and enable settings for operating the occupancy detection sensor 110. According to some exemplary embodiments, the occupancy detection sensor 110 includes one or more passive infrared ("PIR") sensors (not shown). Although the occupancy detection sensor 110 includes PIR sensors, the occupancy detection sensor 110 includes any one or a combination of different occupancy sensing technologies including, but not limited to, PIR, ultrasonic, microwave, and microphonic technologies in other exemplary embodiments.

According to one of the exemplary embodiments, the occupancy detection sensor 110, which uses the PIR sensors to detect occupancy, passively senses the occupancy of the monitored area, activates a signal upon detecting occupancy, continues activating the signal upon sensing the continuing occupancy of the monitored area, enables settings for operating the occupancy detection sensor 110, and enables processing of the settings for the occupancy detection sensor 110. In certain exemplary embodiments, when the occupancy detection sensor 110 activates the signal based upon detecting motion, the associated load is turned on. The occupancy detection sensor 110 utilizes a passive technology, which does not send out a signal to aid in the reception of a signal. However, in certain alternative exemplary embodiments, the occupancy detection sensor 110 utilizes an active technology, such as ultrasonic technology, or a combination of active and passive technologies. A Fresnel lens 113 is positioned on a portion of the in-wall occupancy sensor switch 100 to encompass the PIR sensors that are located within the occupancy detection sensor 110. The use of PIR sensors for determining occupancy in a monitored area are known to people having ordinary skill in the art. In certain exemplary embodiments, the occupancy detection sensor 110 transmits one or more signals to a microcontroller so that the microcontroller is able to determine occupancy within a desired monitored area. In these exemplary embodiments, the occupancy detection sensor 110 automatically sends a signal to the microcontroller at predetermined time intervals, at random time intervals, or only when occupancy is detected. Alternatively, the microcontroller polls the occupancy detection sensor 110 for the occupancy detection sensor 110 to send a signal back to the microcontroller. The microcontroller is able to poll the occupancy detection sensor 110 automatically at predetermined time intervals or at random time intervals.

In some exemplary embodiments, the in-wall occupancy sensor switch 100 includes a load status/motion indicator 114. The load status/motion indicator 114 is located adjacent to the night light 120; however, the load status/motion indicator 114 can be located anywhere on the in-wall occupancy sensor switch 100 so long as the load status/motion indicator 114 is visible to an end-user once the in-wall occupancy sensor switch 100 is installed within the wall box. The load status/motion indicator 114 includes an LED or LED package which provides information to the end-user as to the load status, whether motion has been detected in the monitored area, and/or when to release certain user accessible interfaces, such as the night light 120 and/or the manual controller 195, to effectuate a change in operating mode. According to some exemplary embodiments, the user accessible interfaces 120 and 195 are components located on the face plate 107 of the switch 100 and are accessible to the end-user without the end-user having to disassemble any portion of the switch 100. For example, in certain exemplary embodiments, the load status/motion indicator 114 emits a visible constant light when a load associated with the in-wall occupancy sensor switch 100 is on and emits no light when the load associated with the in-wall occupancy sensor switch 100 is off. Also, in certain exemplary embodiments, the load status/motion indicator 114 emits a momentary flashing light when motion is detected within the monitored area and emits no light when motion is not detected within the monitored area. Moreover, in certain exemplary embodiments, the load status/motion indicator 114 emits a momentary flashing light when either the night light 120 and/or the manual controller 195 has been pressed in and held in for a certain time period, which alerts the end-user to release the night light 120 and/or the manual controller 195 to change the operating mode of the switch 100. In alternative exemplary embodiments, other methods, such as using two or more independent LEDs or LED packages, can be used to show the load status, whether motion has been detected within the monitored area, and/or alert the end-user to release certain user interfaces to effectuate a change in operating mode. For example, one LED or LED package indicates the load status while the second LED or LED package indicates whether motion has been detected in the monitored area. Additionally, the load status/motion indicator 114 can be included within a liquid crystal display ("LCD") screen and include one of text, symbols, numbers, and/or any combinations thereof.

In certain exemplary embodiments, an optically transmissive or clear material (not shown) encapsulates at least a portion of each LED or LED package. This encapsulating material provides environmental protection while transmitting light from the LEDs. In certain exemplary embodiments, the encapsulating material includes a conformal coating, a silicone gel, a cured/curable polymer, an adhesive, or some other material known to a person of ordinary skill in the art having the benefit of the present disclosure. In certain exemplary embodiments, phosphors are coated onto or dispersed in the encapsulating material for creating a desired light color.

The night light 120 includes one or more LEDs (not shown), or LED packages. Although LEDs are described in the exemplary embodiment, other light sources known to people having ordinary skill in the art, including but not limited to organic light emitting diodes ("OLEDs") and liquid crystal display ("LCD") screens, are used in alternative exemplary embodiments without departing from the scope and spirit of the exemplary embodiment. In certain exemplary embodiments, the night light 120 also optionally includes a lens 122 positioned over the LEDs or LED packages. The night light 120 LEDs emit substantially white light having a color temperature between 2500 and 5000 degrees Kelvin. However, in alternative exemplary embodiments, the night light 120 emits any color light at various intensities of that color. The lens 122 is fabricated using an optically transmissive or clear material that encapsulates the LEDs or LED package. In some exemplary embodiments, the lens 122 provides environmental protection while transmitting light from the LEDs. In certain exemplary embodiments, the lens 122 includes a conformal coating, a silicone gel, a cured/curable polymer, an adhesive, or some other material known to a person of ordinary skill in the art having the benefit of the present disclosure. In certain exemplary embodiments, phosphors are coated onto or dispersed in the lens 122 for creating a desired light color that is emitted from the night light 120.

According to some exemplary embodiment, the lens 122 is a push-button lens that is used to turn on the night light 120, turn off the night light 120, and/or dim the night light 120. In certain exemplary embodiments, the night light 120 also is used to change an operating mode of the switch 100, which will be discussed in further detain below. The push-button lens is substantially rectangular; however, the push-button lens can be any geometric or non-geometric shape without departing from the scope and spirit of the exemplary embodiment. In certain exemplary embodiments, when the night light 120 turns on, the LEDs emit light through the lens 122. When the night light 120 turns off, the LEDs emit no light through the lens 122. When the night light 120 is dimmed, the intensity of the light emitted from the LEDs through the lens 122 is varied or the number of LEDs that are on is varied according to end-user desires. For example, the light intensity emitted from the night light 120 is varied by increasing or decreasing the current supplied to the LEDs. In another example, if the night light includes ten LEDs, the number of LEDs that emit light can be increasingly or decreasingly varied from one LED to ten LEDs or ten LEDs to one LED to produce a dimming effect. Although two examples have been provided to illustrate methods for dimming the night light 120, other methods known to people having ordinary skill in the art can be used without departing from the scope and spirit of the exemplary embodiment. In this exemplary embodiment, the lens 122 in pushed in and released to turn on the night light 120 and is pushed in and released again to turn off the night light 120. Once the night light 120 is on, the lens 122 is pushed in and held in to achieve dimming the night light 120. For example, once the night light 120 is turned on, the night light 120 emits light at its maximum intensity. The lens 122 is pushed in and held in to decrease the light intensity emitted from the night light 120 until the desired intensity is reached, at which time the end-user releases the lens 122. If the end-user desires to increase the intensity of the light emitted from the night light 120, the lens 122 is again pushed in and held in until the desired intensity is reached. In another embodiment, the night light 120 operation is the same, except that once the night light 120 is turned on, the night light 120 emits light at a pre-set intensity, which is set by the end-user and is between the maximum intensity and the minimum intensity. For example, the pre-set intensity is the intensity of the light that the night light 120 emitted immediately before being previously turned off. Thus, according to one exemplary embodiments, the lens 122 of the night light 120 is used to control the operation of the night light 120. In an alternate exemplary embodiment, the lens 122 is repeated tapped to increase or decrease the intensity of the light emitted through the night light 120.

Figure 9:
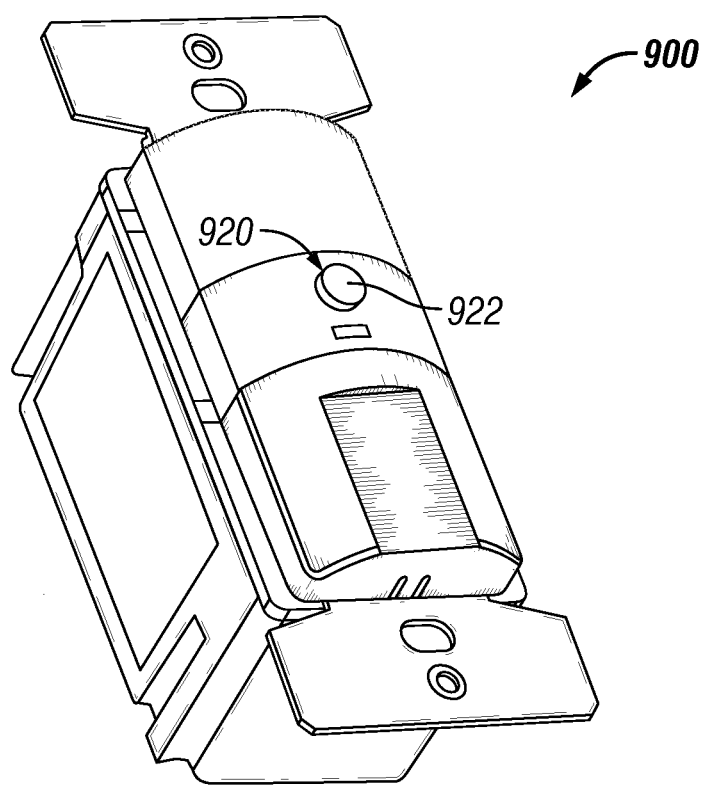
FIG. 9 is a perspective view of an in-wall occupancy sensor switch in accordance with another exemplary embodiment of the present invention.

FIG. 9 is a perspective view of an in-wall occupancy sensor switch 900 in accordance with another exemplary embodiment of the present invention. Referring to FIGS. 1, 2, and 9, the in-wall occupancy sensor switch 900 is similar to the in-wall occupancy sensor switch 100 except that the shape and operation of the night light 920 is different than the night light 120. The night light 920 optionally includes a lens 922 disposed over the LEDs (not shown). The lens 922 is a rotating lens, or dial, that is used to turn on the night light 920, turn off the night light 920, and/or dim the night light 920. In this alternative exemplary embodiment, the lens 922 rotates clockwise and counter-clockwise to achieve turning on the night light 920, turning off the night light 920, and dimming the night light 920. For example, when the lens 922 is in its furthest counter-clockwise direction, the night light 920 is off. As the lens 922 rotates clockwise, the night light 920 initially emits a low intensity light and increases the light intensity emission as the lens 922 is further rotated clockwise. The night light 920 emits the maximum light intensity once the lens 922 is rotated clockwise to its furthest position. In certain exemplary embodiments, the lens 922 is capable of being pushed in and held in for a period of time to effectuate a change in operating mode, which is discussed further below.

Yet, in still further alternative exemplary embodiments, the lens 922 is a combined rotating and push-button lens that is used to turn on the night light 920, turn off the night light 920, dim the night light 920, and/or effectuate a change in operating mode. In this alternative exemplary embodiment, the lens 922 in pushed in to turn on the night light 920 and is pushed in again to turn off the night light 920. Once the night light 920 is on, the lens 922 is rotated clockwise and counter-clockwise to achieve dimming the night light 920. For example, when the lens 922 is in its furthest counter-clockwise direction, the night light 920 emits its lowest intensity light. As the lens 922 rotates clockwise, the night light 920 increases the light intensity emission until the lens 922 reaches its furthest clockwise position which is the setting where the night light 920 emits its maximum light intensity. Additionally, the lens 922 is pushed in and held in for a period of time to effectuate a change in operating mode, which is discussed further below.

Referring back to FIGS. 1 and 2 and according to exemplary embodiments, the night light 120 provides sufficient lighting for end-users at night time to perform different tasks without having to turn on the lighting loads that are electrically coupled to the electrical wiring device. In some exemplary embodiments where the in-wall occupancy sensor switch 100 is positioned at a location where the end-user can reach it without having to bend, the night light 120 provides improved distance illumination than the conventional night lights because it is located at a higher elevation than the conventional night lights. Additionally, night light 120 is integral with the in-wall occupancy sensor switch 100 so that it is not easily removable and subsequently misplaced. Moreover, the night light 120 also assists end-users for locating the in-wall occupancy sensor switch 100 when all the lights in the monitored area are off. Further, according to some exemplary embodiments, the night light 120 is operable to change operating modes of the in-wall occupancy sensor switch 100, which is further described in detail below in conjunction with FIG. 5.

The manual controller 195 adjusts the desired light level of the light fixtures, or loads, electrically coupled to the in-wall occupancy sensor switch 100. The manual controller 195 includes an on/off button 130 according to one exemplary embodiment. Although the exemplary embodiment illustrates that the manual controller 195 includes an on/off button 130, more on/off buttons can be used depending upon the number of loads that are associated with the in-wall occupancy sensor switch 100 without departing from the scope and spirit of the exemplary embodiment. Alternatively, although the manual controller 195 includes on/off button 130 in some exemplary embodiments, the manual controller 195 can be any type of controller that controls the desired light level including, but not limited to, a switch, a dimmer, or a paddle. The on/off button 130 is associated with a relay and controls the desired light level associated with a load (not shown) that is electrically coupled to the in-wall occupancy sensor switch 100. When the on/off button 130 is pressed and released when the load is off, the on/off button 130 turns on the associated load. Conversely, when the on/off button 130 is pressed and released when the load is on, the on/off button 130 turns off the associated load. Additionally, according to some exemplary embodiments, the manual controller 195 includes a recess 131. The recess 131 has a curved-shape, wherein the deepest portion of the recess 131 is positioned along a portion of a centerline axis 201 of the in-wall occupancy sensor switch 100. However, the recess 131 is capable of being formed in other shapes, such as a step recess, in other exemplary embodiments. Additionally, according to some exemplary embodiments, the manual controller 195 is operable to change operating modes of the in-wall occupancy sensor switch 100, which is further described in detail below in conjunction with FIG. 5.

Figure 3:
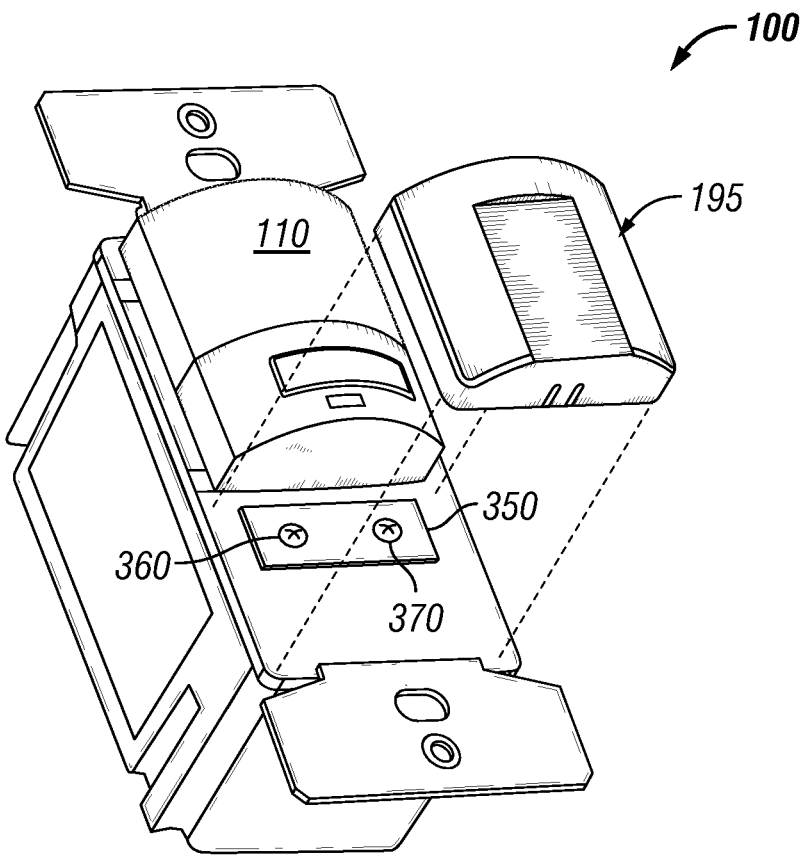
FIG. 3 is an exploded view of the in-wall occupancy sensor switch of FIGS. 1 and 2 in accordance with an exemplary embodiment of the present invention.
Figure 4:
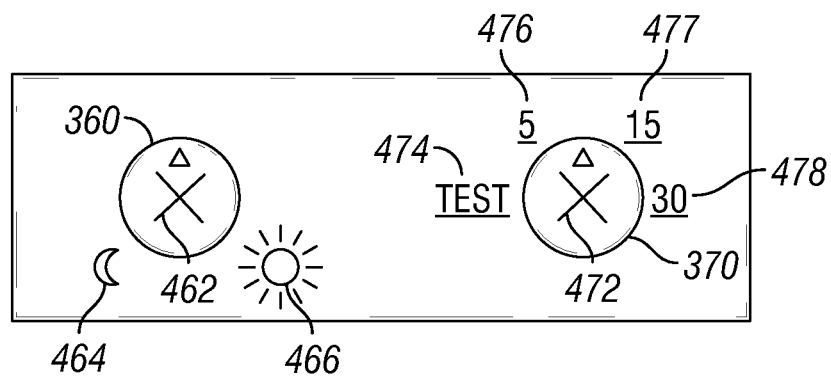
FIG. 4 is an exploded view of a setting controller of the in-wall occupancy sensor switch of FIGS. 1-3 in accordance with an exemplary embodiment of the present invention.

FIG. 3 is an exploded view of the in-wall occupancy sensor switch 100 in accordance with an exemplary embodiment of the present invention. FIG. 4 is an exploded view of a setting controller 350 of the in-wall occupancy sensor switch 100 in accordance with an exemplary embodiment of the present invention. Referring to FIGS. 3 and 4, the manual controller 195 is removable to allow the end-user access to the setting controller 350, which is disposed behind the manual controller 195. The setting controller 350 includes setting selectors, including a daylight sensor level adjuster 360 and an occupancy sensor time delay adjuster 370. Although some exemplary embodiments include both the daylight sensor level adjuster 360 and the occupancy sensor time delay adjuster 370, other exemplary embodiments include either or none of the daylight sensor level adjuster 360 and the occupancy sensor time delay adjuster 370. Additionally, some exemplary embodiments include other setting selectors without departing from the scope and spirit of the exemplary embodiment. Moreover, some exemplary embodiments do not include any setting controllers 350.

Although the daylight sensor level adjuster 360 and the occupancy sensor time delay adjuster 370 are rotating knobs, the daylight sensor level adjuster 360 and the occupancy sensor time delay adjuster 370 can have another shape or form, such as a sliding switch or a push button without departing from the scope and spirit of the exemplary embodiment. According to the exemplary embodiment, the daylight sensor level adjuster 360 and the occupancy sensor time delay adjuster 370 are adjusted by rotating, either clockwise or counter-clockwise, as the situation requires. Further, in this exemplary embodiment, the daylight sensor level adjuster 360 includes a receptacle 462, which is capable of receiving a Philips-head or other known type of screwdriver, thereby facilitating the adjustment of the daylight sensor level adjuster 360. Similarly, the occupancy sensor time delay adjuster 370 includes a receptacle 472, which is capable of receiving a Philips-head or other known type of screwdriver, thereby facilitating the adjustment of the occupancy sensor time delay adjuster 370.

The exemplary daylight sensor level adjuster 360 controls the sensitivity of a daylighting feature, which is an optional feature, and is indicated by a moon picture setting 464 and a sun picture setting 466 at each end of the rotational range. The factory default setting has the daylight sensor level adjuster 360 set in a fully clockwise position at the sun picture setting 466. This factory default setting permits the occupancy detection sensor 110 to turn on the lights of an associated load regardless of the ambient light level in the monitored area. When the daylight sensor level adjuster 360 is rotated counter-clockwise, the daylighting feature activates and prevents lights of an associated load from turning on when the monitored area has adequate ambient light regardless of whether motion is detected in the monitored area. The amount of ambient light required to adequately illuminate the monitored area is set by the daylight sensor level adjuster 360. If there is enough ambient light in the monitored area regardless of occupancy and the daylight feature is activated, the daylight feature holds the lights off for an associated load. If there is not enough ambient light in the monitored area and the daylight feature is activated, the daylight feature allows the lights of the associated load to turn on when occupied. In some exemplary embodiments, the daylight feature maintains the lights of the associated load off even if someone attempts to manually turn on those lights using the manual controller 195 while there is sufficient ambient light available.

In one exemplary embodiment, the adjustment for the daylight sensor level adjuster 360 is infinite in between the moon position setting 464 and the sun position setting 466 and is used to control a microcontroller's 610 (FIG. 6) interpretation of the signal received. Turning the daylight sensor level adjuster 360 towards the moon position setting 464 reduces the amount of ambient light required before turning on the light sources of the associated load. Conversely, turning the daylight sensor level adjuster 360 towards the sun position setting 466 increases the amount of ambient light required before turning on the light sources of the associated load. The functions for the sun position setting 466 and the moon position setting 464 can be reversed in alternative exemplary embodiments.

The exemplary occupancy sensor time delay adjuster 370 controls the time delay for the lights of an associated load to remain on after motion is no longer detected within the monitored area. The exemplary occupancy sensor time delay adjuster 370 is indicated by a "TEST" setting 474 and a "30" setting 478 at each end of the rotational range. Within the rotational range, a "5" setting 475 is indicated adjacent to the "TEST" setting 474 and a "15" setting 477 is indicated between the "5" setting 475 and the "30" setting 478. The "TEST" setting 474 represents a five second time delay. The "5" setting 475 represents a five minute time delay. The "15" setting 477 represents a fifteen minute time delay. The "30" setting 478 represents a thirty minute time delay and is also a factory default time delay setting. Although exemplary time delays and factory default time delay settings have been provided, the time delays and factory time delay settings can be varied to longer or shorter time delay settings without departing from the scope and spirit of the exemplary embodiments. In one exemplary embodiment, the adjustment for the occupancy sensor time delay adjuster 370 is infinite in between the "TEST" setting 474 and the "30" setting 478 and is used to control the microcontroller's 610 (FIG. 6) interpretation of the signal received. The time delay setting is reduced when turning the occupancy sensor time delay adjuster 370 counter-clockwise towards the "TEST" setting 474. Conversely, the time delay setting is increased when turning the occupancy sensor time delay adjuster 370 clockwise towards the "30" setting 478.

Figure 5:
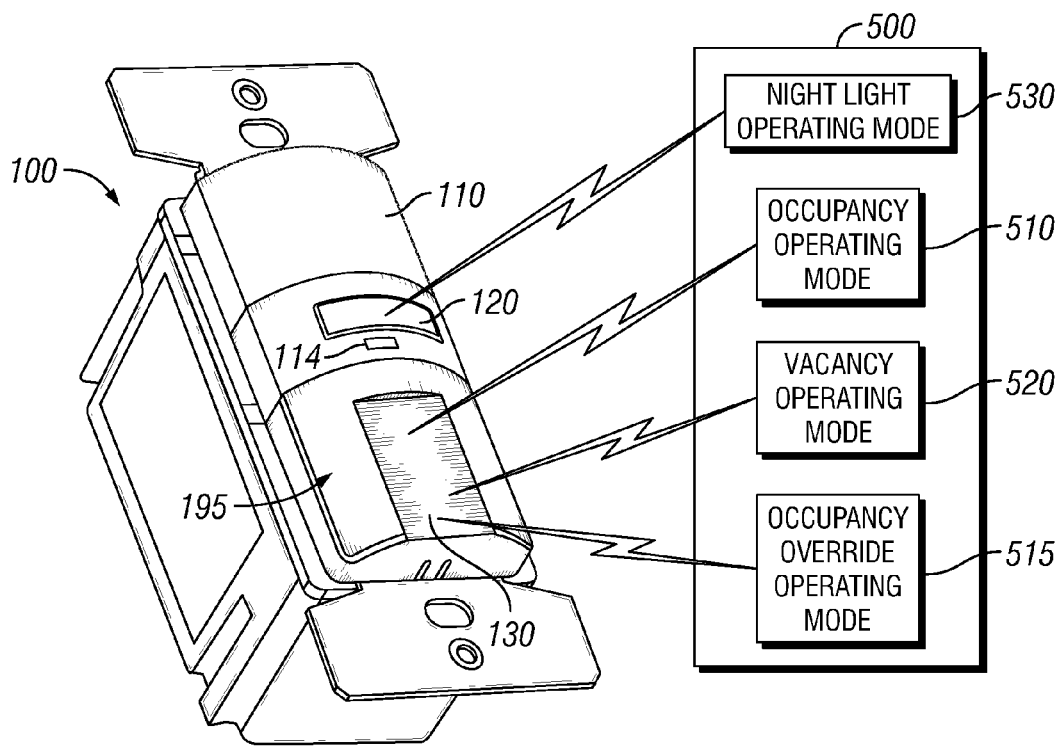
FIG. 5 is a schematic block diagram of operating mode selections for the in-wall occupancy sensor switch of FIGS. 1-4 in accordance with an exemplary embodiment of the present invention.

FIG. 5 is a schematic block diagram of operating mode selections 500 for the in-wall occupancy sensor switch 100 in accordance with an exemplary embodiment. Referring to FIG. 5, the operating mode selections 500 include an occupancy operating mode 510, an occupancy override operating mode 515, a vacancy operating mode 520, and a night light operating mode 530. Although four different operating modes 510, 515, 520, and 530 are illustrated, the number of operating modes is capable of being increased or decreased without departing from the scope and spirit of the exemplary embodiment. Each of these operating modes 510, 515, 520, and 530 are selectable by manipulating one or more accessible user interfaces, such as the night light 120 and/or the manual controller 195. As previously mentioned, these accessible user interfaces are accessible to the end-user without having to disassemble any portion of the switch 100. According to some exemplary embodiments, the accessible user interfaces 120 and 195 are pressed in, held in, and released to effectuate a change in operating modes. According to other exemplary embodiments, the accessible user interfaces 120 and 195 are pressed in and released one or more times in a predetermined combination of presses to effectuate a change in operating modes. This allows the end-user to change operating modes of the switch 100, without the changes being accidental. In some exemplary embodiments, the load status/motion indicator 114 flashes to indicate an elapsed time that the accessible user interface 120 and 195 has been pressed in so that the end-user releases the accessible user interface 120 and 195 to effectuate a change in operating modes.

The occupancy operating mode 510 operates with the occupancy detection sensor 110 being operational, either with the daylight feature being activated or deactivated. In this occupancy operating mode 510, with the daylight feature being deactivated, the lights of the associated load turn on when the occupancy detection sensor 110 in combination with the microcontroller 610 (FIG. 6) detect motion in the monitored area and turn off when the occupancy detection sensor 110 in combination with the microcontroller 610 (FIG. 6) no longer detect motion in the monitored area after a pre-set time delay. This pre-set time delay is set according to the occupancy sensor time delay adjuster 370 and is between five seconds to thirty minutes. However, in alternative exemplary embodiments, the pre-set time delay is variable from about zero seconds to about one hour. In certain exemplary embodiments, the lights of the associated load also are capable of turning on and off by the end-user manually by pressing and releasing the on/off button 130.

The occupancy override operating mode 515 operates with the occupancy detection sensor 110 not being operational. Hence, the occupancy override operating mode 515 is also referred to a manual operating mode. In this occupancy override operating mode 515, the lights of the associated load turn on or off when the end-user presses and releases the on/off button 130. For example, if the lights are on, the lights turn off when the end-user presses and releases the on/off button 130. In another example, if the lights are off, the lights turn on when the end-user presses and releases the on/off button 130.

The vacancy operating mode 520 operates with the occupancy detection sensor 110 being operational. However, signals from the occupancy detection sensor 110 are utilized for only turning off the lights of the associated load when occupancy is no longer detected. Signals from the occupancy detection sensor 110 are not used to turn on the lights of the associated load. In this vacancy operating mode 520, the lights of the associated load turn on when the end-user presses and releases the on/off button 130 and turn off when the occupancy detection sensor 110 in combination with the microcontroller 610 (FIG. 6) no longer detect motion in the monitored area after a pre-set time delay, which has been previously discussed. In certain exemplary embodiments, the lights of the associated load also are capable of turning off by the end-user manually by pressing and releasing the on/off button 130.

The on/off button 130 is operable for the end-user to select an operating mode between the occupancy operating mode 510, the occupancy override operating mode 515, and the vacancy operating mode 520. In one exemplary embodiment, the on/off button 130 is pressed for five seconds and then released to toggle and/or select the operating mode between the occupancy operating mode 510 and the vacancy operating mode 520. For example, if the in-wall occupancy sensor switch 100 is operating in occupancy operating mode 510, the end-user presses and holds the on/off button 130 for five seconds and then releases the on/off button 130 to change the operating mode to vacancy operating mode 520. Conversely, if the in-wall occupancy sensor switch 100 is operating in vacancy operating mode 520, the end-user presses and holds the on/off button 130 for five seconds and then releases the on/off button 130 to change the operating mode to occupancy operating mode 510. Although the on/off button 130 is described as having to be pressed in for five seconds to toggle between the occupancy operating mode 510 and the vacancy operating mode 520, the time that the on/off button 130 is to be pressed in is more or less in alternative exemplary embodiments. Additionally, in certain exemplary embodiments, the load status/motion indicator 114 flashes to indicate an elapsed time, such as five seconds, that the on/off button 130 has been pressed in. This flashing of the load status/motion indicator 114 informs the end-user as to when to release the on/off button 130. According to other exemplary embodiments, the on/off button 130 and/or the night light button 120 are pressed in and released one or more times in a predetermined combination of presses to effectuate a change in operating modes.

The occupancy override operating mode 515 is activated when the end-user presses and holds the on/off button 130 for ten seconds and then releases the on/off button 130. In certain exemplary embodiments, the load status/motion indicator 114 flashes to indicate an elapsed time, such as at every five second interval, that the on/off button 130 has been pressed in. This flashing of the load status/motion indicator 114 informs the end-user as to when to release the on/off button 130. Although the on/off button 130 is described as having to be pressed in for ten seconds to activate the occupancy override operating mode 515, the time that the on/off button 130 is to be pressed in is more or less in alternative exemplary embodiments. According to other exemplary embodiments, the on/off button 130 and/or the night light button 120 are pressed in and released one or more times in a predetermined combination of presses to effectuate a change in operating modes.

The night light operating mode 530 is another mode that the in-wall occupancy sensor switch 100 is capable of operating. Operation of the in-wall occupancy sensor switch 100 while in the night light operating mode 530 is dependent upon the status of the night light 120. In the night light operating mode 530, if the night light 120 is on, the in-wall occupancy sensor switch 100 operates as if it were in the vacancy operating mode 520. Thus, the occupancy detection sensor 110 in combination with the microcontroller 610 (FIG. 6) does not turn on the lights of the associated load when motion is detected. However, the lights of the associated load is turned on manually using the on/off button 130, if the end-user desires depending upon the situation. Conversely, in the night light operating mode 530, if the night light 120 is off, the in-wall occupancy sensor switch 100 operates as if it were in the occupancy operating mode 510. Hence, the occupancy detection sensor 110 in combination with the microcontroller 610 (FIG. 6) turns on the lights of the associated load when motion is detected in the monitored area and turns off the lights of the associated load when motion is not detected after a pre-set time delay. This night light operating mode 530 is useful in certain situations. For example, if children are sleeping in their bedrooms at night with the light from the associated load being off and the night light 120 being on, a parent is able to enter the room to monitor the children without having the lights of the associated load turn on. Therefore, the children are not disturbed from the brighter lights of the associated load because those lights do not turn on due to motion in the monitored area. The night light 120 provides sufficient lighting for the parent to visibly monitor the children.

The night light operating mode 530 is activated when the end-user presses and holds the night light button 120 for five seconds and then releases the night light button 120. In certain exemplary embodiments, the load status/motion indicator 114 flashes to indicate an elapsed time, such as five seconds, that the night light button 120 has been pressed in. This flashing of the load status/motion indicator 114 informs the end-user as to when to release the night light button 120. Although the night light button 120 is described as having to be pressed in for five seconds to activate the night light operating mode 530, the time that the night light button 120 is to be pressed in is more or less in alternative exemplary embodiments. To exit the night light operating mode 530, the end-user chooses another operating mode. For example, the end-user presses and holds the on/off button 130 for five seconds and then releases the on/off button 130 to change the operating mode to the occupancy operating mode 510. According to other exemplary embodiments, the on/off button 130 and/or the night light button 120 are pressed in and released one or more times in a predetermined combination of presses to effectuate a change in operating modes.

Thus, according to some exemplary embodiments, the several operating modes for the in-wall occupancy sensor switch 100 is changeable using accessible user interfaces located on the exterior surface of the face plate 107, such as the manual controller 195, or the on/off button 130, and the night light 120. Thus, there is no need to disassemble any portion of the in-wall occupancy sensor switch 100 to change operating modes. In some exemplary embodiments, only the night light 130 is used to change operating modes. In other exemplary embodiments, only the on/off button 130, or manual controller 195, is used to change operating modes. Although the night light 120 and the on/off button 130 have been described as accessible user interfaces located on the exterior surface of the face plate 107 for changing operating modes, other devices, such as other push buttons, rotatable knobs, or sliders, can be located on the front plate 107 and used for changing operating modes without departing from the scope and spirit of the exemplary embodiment.

Figure 6:
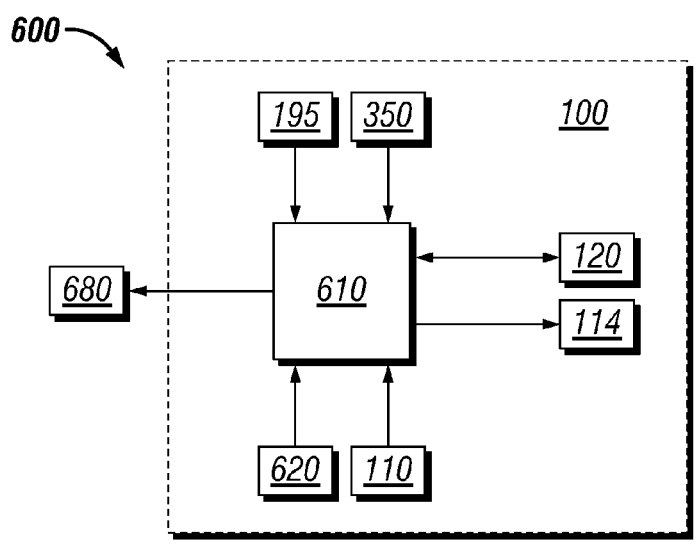
FIG. 6 is a schematic block diagram of an in-wall occupancy sensor control system using the in-wall occupancy sensor switch of FIGS. 1-5 in accordance with an exemplary embodiment of the present invention.

FIG. 6 is a schematic block diagram of an in-wall occupancy sensor control system 600 using the in-wall occupancy sensor switch 100 of FIGS. 1-5 in accordance with an exemplary embodiment of the present invention. Referring to FIG. 6, the in-wall occupancy sensor control system 600 includes the in-wall occupancy sensor switch 100 and an associated load 680. However, in alternate exemplary embodiments, the number of loads electrically coupled to the in-wall occupancy sensor switch 100 can be greater without departing from the scope and spirit of the exemplary embodiments. Referring to FIGS. 1-6, the in-wall occupancy sensor switch 100 includes a microcontroller 610, a daylight detection sensor 620, an occupancy detection sensor 110, a manual controller 195, a settings controller 350, a night light 120, and a load status/motion indicator 114. In other exemplary embodiments, at least one of the daylight detection sensor 620, the settings controller 350, and the load status/motion indicator 114 is optional.

The microcontroller 610 receives information from one or more of the daylight detection sensor 620, the occupancy detection sensor 110, the manual controller 195, the settings controller 350, and the night light 120. The microcontroller 610 processes the information received and transmits one or more signals to the load 680, the night light 120, and the load status/motion indicator 114 pursuant to the descriptions previously provided. The occupancy detection sensor 110, the manual controller 195, the settings controller 350, the night light 120, the load 680, and the load status/motion indicator 114 operate according to the disclosure previously described.

The daylight detection sensor 620 is positioned within the in-wall occupancy sensor switch 100 according to one exemplary embodiment; however, alternative exemplary embodiments have the daylight detection sensor 620 positioned anywhere within the monitored area without departing from the scope and spirit of the exemplary embodiment. The daylight detection sensor 620 measures the amount of ambient light present within the monitored area and sends the information to the microcontroller 610, either via a hardwire communication or via a wireless communication, for processing. Depending upon the settings of the settings controller 350, the microcontroller 610 turns off the load 680 or can reduce the energy being supplied to the load 680 based upon the amount of ambient light present within the monitored area regardless of the occupancy in the monitored area. This feature allows for reducing energy consumption. For example, if the monitored area is occupied and the amount of ambient light meets or exceeds a desired set threshold, the microcontroller 610 reduces the energy sent to the load 680.

Figure 7:
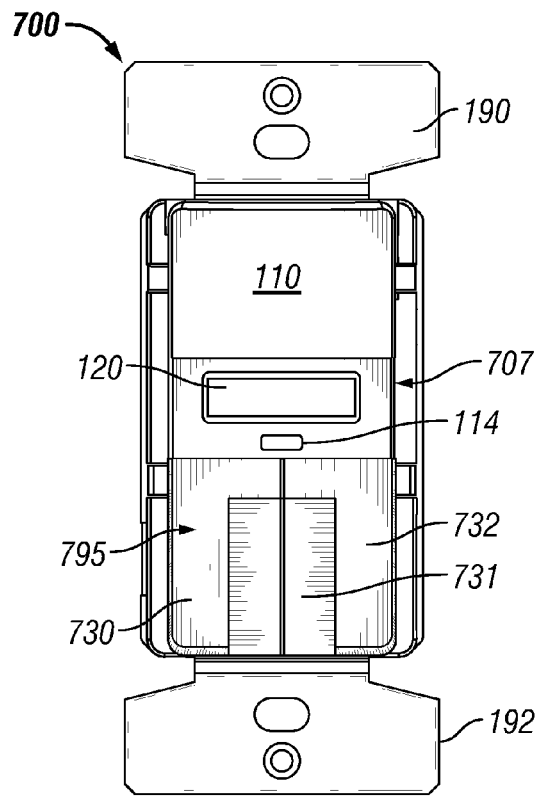
FIG. 7 is a front elevation view of an in-wall occupancy sensor switch in accordance with another exemplary embodiment of the present invention.

FIG. 7 is a front elevation view of an in-wall occupancy sensor switch 700 in accordance with another exemplary embodiment of the present invention. Referring to FIG. 7, the in-wall occupancy sensor switch 700 is a dual load switch and includes the upper coupling band 190, the lower coupling band 192, the body (not shown), and a face plate 707. The face plate 707 includes the occupancy detection sensor 110, the night light 120, and a manual controller 795. The face plate 707 is similar to the face plate 107 (FIG. 1) of the in-wall occupancy sensor switch 100 (FIG. 1) except that manual controller 795 is different than manual controller 195 (FIG. 1). Manual controller 795 is similar to manual controller 195 (FIG. 1) except that manual controller 795 controls two loads (not shown) and includes a first on/off button 730 and a second on/off button 732, instead of single on/off button 130 (FIG. 1). The first on/off button 730 is positioned adjacent the second on/off button 732. The first on/off button 730 controls a first load, while the second on/off button 732 controls a second load. A recess 731 is formed within the manual controller 795 and extends across both the first on/off button 730 and the second on/off button 732. Recess 731 is similar to recess 131 (FIG. 1). In other exemplary embodiments, a recess is encompassed within each on/off button 730 and 732 or there are no recesses formed in either or at least one of the on/off buttons 730 and 732. Although this exemplary embodiment includes the manual controller 795 having a first on/off button 730 and a second on/off button 732, the manual controller 795 can have a greater number of on/off buttons without departing from the scope and spirit of the exemplary embodiment. In some exemplary embodiments, the in-wall occupancy sensor switch 700 includes the load status/motion indicator 114, which has been previously described. According to this exemplary embodiment, the operating modes for the in-wall occupancy sensor switch 700 is the same as the operating modes for the in-wall occupancy sensor switch 100 (FIG. 1) and are selected in similar manners. However, the night light 120 and the first on/off button 732, similar to on/off button 130 (FIG. 1), is used to change operating modes. In certain alternative exemplary embodiments, the operating modes are changed using one or more of the night light 120, the first on/off button 730, and the second on/off button 732.

Figure 8:
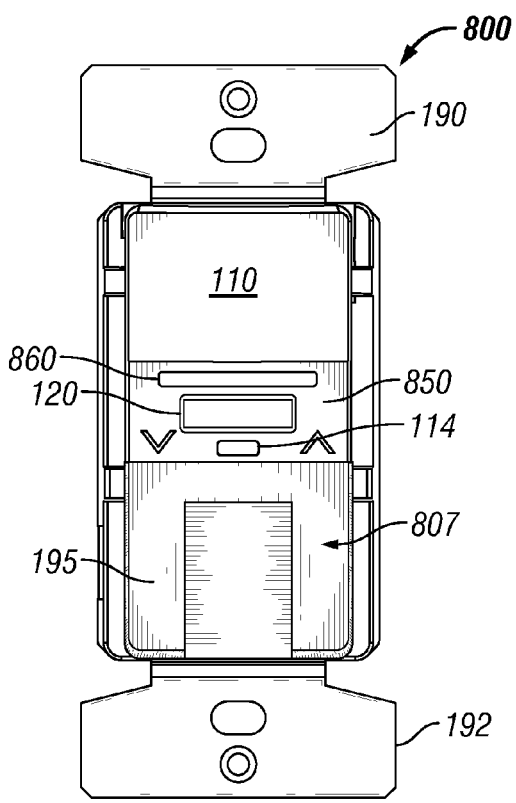
FIG. 8 is a front elevation view of an in-wall occupancy sensor switch in accordance with another exemplary embodiment of the present invention.

FIG. 8 is a front elevation view of an in-wall occupancy sensor switch 800 in accordance with another exemplary embodiment of the present invention. Referring to FIG. 8, the in-wall occupancy sensor switch 800 is a dimmer switch and includes the upper coupling band 190, the lower coupling band 192, the body (not shown), and a face plate 807. The face plate 807 includes the occupancy detection sensor 110, the night light 120, the manual controller 195, a dimmer switch 850, and a dimmer level indicator 860. The face plate 807 is similar to faceplate 107 (FIG. 1) except that the faceplate 807 includes the dimmer switch 850 and the dimmer indicator 860. Incorporating dimmer switches into an electrical wiring device is known to people having ordinary skill in the art. The dimmer level indicator 860 informs the end-user as to what level the dimmer switch 850 is operating at. Incorporating these dimmer level indicators 860 also are known to people having ordinary skill in the art. In some exemplary embodiments, the in-wall occupancy sensor switch 800 includes the load status/motion indicator 114, which has been previously described. According to this exemplary embodiment, the operating modes for the in-wall occupancy sensor switch 800 is the same as the operating modes for the in-wall occupancy sensor switch 100 (FIG. 1) and are selected in similar manners.

Although each exemplary embodiment has been described in detail, it is to be construed that any features and modifications that are applicable to one embodiment are also applicable to the other embodiments. Furthermore, although the invention has been described with reference to specific embodiments, these descriptions are not meant to be construed in a limiting sense. Various modifications of the disclosed embodiments, as well as alternative embodiments of the invention will become apparent to persons of ordinary skill in the art upon reference to the description of the exemplary embodiments. It should be appreciated by those of ordinary skill in the art that the conception and the specific embodiments disclosed may be readily utilized as a basis for modifying or designing other structures or methods for carrying out the same purposes of the invention. It should also be realized by those of ordinary skill in the art that such equivalent constructions do not depart from the spirit and scope of the invention as set forth in the appended claims. It is therefore, contemplated that the claims will cover any such modifications or embodiments that fall within the scope of the invention.

What is claimed is:

1. A light switch device, comprising:
a night light, the night light comprising one or more light sources for emitting light; and
a user accessible switch, the user accessible switch used to control at least one load external to the light switch device,
wherein the intensity of the light emitted from the night light is variable, and
wherein the light switch device is configured to be electrically coupled to and control the at least one load.

2. The light switch device of claim 1, wherein the night light further comprises a lens disposed over the light sources, wherein the lens allows the light to be emitted therethrough.

3. The light switch device of claim 2, wherein manipulation of the lens is used to adjust the intensity of the light emitted from the night light.

4. The light switch device of claim 3, wherein the lens is pressed in and held in to adjust the intensity of the light emitted from the night light.

5. The light switch device of claim 3, wherein the lens is pressed in and released to turn on or turn off the light emitted from the night light.

6. The light switch device of claim 3, wherein the lens is rotated to turn on or turn off the light emitted from the night light.

7. The light switch device of claim 3, wherein the lens is rotated to adjust the intensity of the light emitted from the night light.

8. The light switch device of claim 1, further comprising:
a microcontroller communicably coupled to the night light and the at least one load,
an occupancy detection sensor communicably coupled to the microcontroller, the occupancy detection sensor sending one or more signals to the microcontroller to allow the microcontroller to determine occupancy within a monitored area; and
a manual controller communicably coupled to the microcontroller,
wherein the light switch device is operable in a plurality of operating modes,
wherein the manual controller and the night light are accessible to an end-user without any portion of the device being disassembled,
wherein the operating modes are selected by manipulating one or more of the night light and manual controller, and
wherein the microcontroller controls operation of the at least one load based upon the operating mode selected.

9. The light switch device of claim 8, further comprising an indicator communicably coupled to the microcontroller, the indicator providing information to the end-user as to when to stop manipulating one or more of the night light and manual controller, thereby resulting in a change in the operating mode of the light switch device.

10. The light switch device of claim 8, wherein the light switch device is operable in an occupancy operating mode, wherein the microcontroller turns on the at least one load when occupancy within the monitored area is detected and turns off the at least one load when occupancy within the monitored area is no longer detected.

11. The light switch device of claim 8, wherein the light switch device is operable in an occupancy override operating mode, wherein the microcontroller turns on or off the at least one load based only upon operation of the manual controller.

12. The light switch device of claim 8, wherein the light switch device is operable in a vacancy operating mode, wherein the microcontroller turns on the at least one load only when the manual controller is operated, and wherein the microcontroller turns off the at least one load when occupancy within the monitored area is no longer detected.

13. The light switch device of claim 8, wherein the light switch device is operable in a night light operating mode, wherein operation of the light switch device in the night light operating mode is dependent upon the status of the night light.

14. The electrical wiring device of claim 13, wherein the microcontroller turns on the at least one load only when the manual controller is operated when the light switch device is operating in the night light operating mode with the night light on.

15. The light switch device of claim 13, wherein the microcontroller turns on the at least one load when occupancy within the monitored area is detected and turns off the at least one load when occupancy within the monitored area is no longer detected when the light switch device is operating in the night light operating mode with the night light off.

16. An electrical wiring device, comprising:
a night light, the night light comprising:
one or more sources for emitting light; and
a lens optically coupled to the sources, wherein the lens is entirely translucent, allowing the light to be emitted therethrough;
wherein the intensity of the light emitted from the night light is variable, and
wherein manipulation of the lens is used to adjust the intensity of the light emitted from the night light.

17. The electrical wiring device of claim 16, wherein the lens is pressed in and held to adjust the intensity of the light emitted from the night light.

18. The electrical wiring device of claim 16, wherein the lens is pressed in and released to turn on or turn off the light emitted from the night light.

19. The electrical wiring device of claim 16, wherein the lens is rotated to turn on or turn off the light emitted from the night light.

20. The electrical wiring device of claim 16, wherein the lens is rotated to adjust the intensity of the light emitted from the night light.

21. A lighting control system, comprising:
at least one load positioned within an area; and
a light switch electrically coupled to and configured to control the at least one load, wherein the at least one load is external to the light switch, and wherein the light switch comprises:
a night light, the night light comprising one or more sources for emitting light, wherein the intensity of the light emitted from the night light is variable.

22. The lighting control system of claim 21, wherein the night light further comprises a lens optically coupled to the sources, the lens allowing the light to be emitted therethrough.

23. The lighting control system of claim 22, wherein manipulation of the lens is used to adjust the intensity of the light emitted from the night light.

24. The lighting control system of claim 21, wherein the light switch further comprises:
a microcontroller communicably coupled to the night light and at least one load,
an occupancy detection sensor communicably coupled to the microcontroller, the occupancy detection sensor sending one or more signals to the microcontroller to allow the microcontroller to determine occupancy within a monitored area; and
a manual controller communicably coupled to the microcontroller,
wherein the light switch is operable in a plurality of operating modes,
wherein the manual controller and the night light are accessible to an end-user without any portion of the device being disassembled, and
wherein the operating modes are selected by manipulating one or more of the night light and manual controller.

25. The lighting control system of claim 24, wherein the light switch further comprises an indicator communicably coupled to the microcontroller, the indicator providing information to the end-user as to when to stop manipulating one or more of the night light and manual controller, thereby resulting in a change in the operating mode of the light switch.

26. A method for operating a night light formed within a light switch device, comprising:
providing a light switch device comprising a night light, the night light comprising one or more light sources for emitting light; and
manipulating the intensity of the light emitted from the night light, wherein the light switch device is configured to be electrically coupled to and control at least one load external to the light switch device in response to a user accessible switch or an occupancy sensor.

27. The method of claim 26, wherein the night light further comprises a lens disposed over the light source, wherein the lens allows the light to be emitted therethrough.

28. The method of claim 27, wherein manipulating the intensity of the light comprises at least one of pressing and holding in or rotating the lens to adjust the intensity of the light emitted from the night light.

29. The method of claim 27, wherein manipulating the intensity of the light comprises at least one of pressing and holding in or rotating the lens to turn on or turn off the light emitted from the night light.

30. The method of claim 26, wherein the light switch device is operable in a plurality of operating modes.

31. The method of claim 30, wherein one or more of the plurality of operating modes are selected from a group consisting of an occupancy operating mode, an occupancy override mode, a vacancy operating mode, and a night light operating mode.

32. An electrical wiring device, comprising:
a night light comprising one or more sources for emitting light; and
a manual interface communicably coupled to the night light,
wherein the intensity of the light emitted from the night light is variable,
wherein manipulation of the manual interface is used to adjust the intensity of the light emitted from the night light,
wherein the electrical wiring device is configured to be coupled to and control at least one load, wherein the at least one load is external to the electrical wiring device, and
wherein the electrical wiring device comprises a user accessible interface, an occupancy sensor, or both, to control the at least one load.

33. The electrical wiring device of claim 32, wherein the manual interface is pressed in and held to adjust the intensity of the light emitted from the night light.

34. The electrical wiring device of claim 32, wherein the manual interface is pressed in and released to turn on or turn off the light emitted from the night light.

35. The electrical wiring device of claim 32, wherein the manual interface is rotated to turn on or turn off the light emitted from the night light.

36. The electrical wiring device of claim 32, wherein the manual interface is rotated to adjust the intensity of the light emitted from the night light.

37. The electrical wiring device of claim 1, wherein the wiring device is operable in a plurality of operating modes, one or more of the plurality of operating modes selected from a group consisting of an occupancy operating mode, an occupancy override mode, a vacancy operating mode, and a night light operating mode.

* * * * *